United States Patent Office 3,167,595
Patented Jan. 26, 1965

3,167,595
PREPARATION OF EXO-DICYCLOPENTADIENE
Donald L. Heywood and Benjamin Phillips, Charleston, W. Va., assignors to Union Carbide Corporation, a corporation of New York
No Drawing. Filed July 18, 1961, Ser. No. 124,784
11 Claims. (Cl. 260—666)

This invention relates to a process for preparing exo-dicyclopentadiene.

In recent years, there has been a marked growth in the use of polyepoxide monomers, in resin-forming operations, for application in fields such as coating, laminating, bonding, molding, casting, encapsulating, and the like. A particularly useful and outstanding polyepoxide monomer in such fields is the diepoxide of endo-dicyclopentadiene. However, the epoxy resin artisan encounters several disadvantages when employing the diepoxide of endo-dicyclopentadiene in resin-forming operations due to its high melting point, i.e., about 188° C. For instance, for many fields of application it is desirable to prepare a homogeneous, curable epoxide formulation containing polyepoxide monomer which possesses a relatively mobile viscosity. One route for obtaining homogeneity and reduction of viscosity of a viscous, curable epoxide formulation can be effected by the application of heat. However, extended heating can result in premature and localized curing, or the expulsion of the components comprising the formulation, or the promotion of high exothermic heat accumulations during subsequent curing cycles. All of these illustrative disadvantages can internally damage the ultimately cured resin. Another disadvantage is that normally-solid or extremely viscous epoxide formulations are difficult to manage and handle. Non-reactive, inert, normally-liquid solvents oftentimes are employed to prepare a more workable and manageable curable epoxide formulation. The use of non-reactive, inert, normally-liquid solvents, however, entails additional equipment, additional procedures, and is time consuming. Moreover, some solvent may be trapped in the cured resin, or it may produce bubbles which are trapped in the cured resin, thereby creating irregularities and weak points. Unremovable amounts of such entrained bubbles and solvent lower the physical characteristics of the resin, e.g., flexural strength, hardness, impact strength, heat distortion point, etc., and, in addition, provide sites for attack by chemicals.

On the other hand, the diepoxide of exo-dicyclopentadiene possesses a relatively low melting point, i.e., less than 60° C., which is substantially below the melting point of the corresponding diepoxide of the endo-isomer. As a consequence, the above illustrative disadvantages, which can result by using the relatively high melting diepoxide of the endo isomer in epoxide formulations, are substantially minimized or avoided by employing the diepoxide of the exo isomer, or a mixture of diepoxides of the exo and endo isomers, in the epoxide formulation. The diepoxide of exo-dicyclopentadiene can be prepared via the diepoxidation route of the exo diene precursor, i.e., exo-dicyclopentadiene, with an epoxidation agent, as will be explained hereinafter.

Accordingly, one or more of the following objects will be achieved by the practice of the invention.

It is an object of the invention to provide a novel process for producing exo-dicyclopentadiene. It is another object of the invention to provide a novel dehydration process whereby competing and undesirable side reactions of the desired product are substantially minimized. A further object of the invention is to provide a novel dehydration process which results in high efficiencies and yields of the exo-dicyclopentadiene product. A still further object of the invention is to provide a novel process wherein the equipment requirements are fulfilled in an economical and advantageous manner. These and other objects will become apparent to those skilled in the art in the light of the teachings of the instant specification.

The broad aspect of the invention is directed to the catalytic dehydration process of exo-dicyclopentadiene hydrate, i.e., exo-tricyclo[5.2.1.0$^{2,6}$]dec-3-en-8-ol, at elevated temperatures, thus producing exo-dicyclopentadiene, i.e., exo-tricyclo[5.2.1.0$^{2,6}$]deca-3,8-diene. The process results in reaction rates, efficiencies, and/or yields that are extraordinarily and markedly high especially in view of the numerous competing and undesirable side reactions which strive to take place such as rearrangement, polymerization, dedimerization, and the like. The basic reaction can best be shown by the following chemical equation:

exo-dicyclopentadiene hydrate        exo-dicyclopentadiene

The exo-dicyclopentadiene hydrate reagent is prepared by the reaction of the endo-dicyclopentadiene precursor with an aqueous solution of an inorganic acidic catalyst, e.g., an aqueous solution of 25 weight percent sulfuric acid, at an elevated temperature e.g., from about 75° C., and lower, to about 125° C., and higher, and for a period of time sufficient to produce exo-dicyclopentadiene hydrate. Analysis of the resulting dicyclopentadiene hydrate product establishes that it is of the exo-form. Endo-dicyclopentadiene, as is well known, can be prepared via the Diels-Alder synthesis of cyclopentadiene.

The novel process is effected in the presence of various dehydration catalysts, which catalysts are well known to one possessing ordinary skill in the art. More specifically, the catalysts which are contemplated are the normally-solid dehydration catalysts, or the normally-liquid dehydration catalysts which are deposited or impregnated on a solid carrier. Illustrative dehydration catalysts include, among others, alumina, thoria, titania, silica-alumina, silica-titania, zirconia, magnesium oxide, beryllium oxide, tungsten oxide, and the like. Additional dehydration catalysts, include, for example, polyphosphoric acid and ortho-phosphoric acid deposited or impregnated on various supports or carriers, e.g., pumice, kieselguhr, asbestos, alumina, silica, carbon, and the like. Other illustrative dehydration catalysts which can be employed include sodium bisulfate, aluminum phosphate, aluminum silicate, calcium phosphate, magnesium phosphate, sodium phosphite on bauxite, and the like. Preferred dehydration catalysts are exemplified by alumina, thoria, silica-alumina, polyphosphoric acid and ortho-phosphoric acid (e.g., 85 weight percent) deposited on carriers such as those illustrated supra, and the like. The above enumerated dehydration catalysts, and others, are adequately described in the text entitled "Catalysis," Volume VII, Edited by Paul H. Emmett, Reinhold Publishing Corporation, New York, 1960, especially pages 97–99 and 140–144.

The dehydration reaction is effected at elevated temperatures, for example, from about 100° C., and lower, to about 500° C., and higher. A temperature in the range of from about 180° C. to about 350° C. is preferred. Outstanding results, from efficiency and yield standpoints, are achieved by conducting the reaction at a temperature range of from about 210° C. to about 330° C. The operative pressure can be subatmospheric, atmospheric, or superatmospheric. In general, commendable results are obtained by maintaining the reaction at atmospheric pressure or subatmospheric pressure, e.g., from about 1.0 mm. of Hg to about 760 mm. of Hg. The preferred range can be from about 10 mm. of Hg to atmospheric pressure.

The residence period will depend, to a significant extent, on a correlation of factors such as the operative temperature, operative pressure, choice of catalyst, inert diluent, if any, and other considerations. It has been observed that a prolonged residence period fosters competing and undesirable side reactions. As a consequence, it is highly advantageous, from economic and practical considerations to avoid undue prolongation of the residence time. Excellent efficiencies and yields accrue by maintaining a unit mass of reaction mixture, in the reaction zone, for a period of time which ranges from less than one second to several minutes. A preferred range is from about 0.05 second to about 1 minute. In a highly preferred aspect of the invention, a unit mass of reaction mixture enters into, for example, an elongated reaction zone and exits from said zone within 0.1 second to about 20 seconds.

It is desirable to correlate the operative variables of the system so that the exo-dicyclopentadiene product can be removed as a gaseous product from the reaction zone. Moreover, in the highly preferred aspect of the invention, an elongated reaction zone is maintained under operative conditions such that the through-put of a unit mass of reaction mixture comprising exo-dicyclopentadiene hydrate reagent, into said zone, will exit as a gaseous reaction product mixture comprising exo-dicyclopentadiene product, unreacted exo-dicyclopentadiene hydrate reagent, inert diluent, if employed, and so forth.

The dehydration reaction can be conducted in the presence of a gaseous or normally-liquid diluent which is inert and unreactive to the reagent and product. Illustrative diluents include, for instance, the aliphatic, cycloaliphatic, and aromatic hydrocarbons, e.g., pentane, hexane, heptane, octane, cyclopentane, methylcyclopentane, cyclohexane, methylcyclohexane, ethylcyclohexane, cycloheptane, benzene, toluene, xylene, diethyltoluene, and the like; the organic ethers such as the dialkyl ethers and diaryl ethers, e.g., methyl ether, ethyl ether, propyl ether, methyl ethyl ether, diphenyl ether, and the like; the inert gases, e.g., helium, neon, argon, and the like. Other illustrative diluents which are suitable include water, decahydronaphthalene, tetrahydronaphthalene, and the like.

The novel process can be carried out in batch, semicontinuous, or continuous fashion. It is essential from economical and commercial considerations, as intimated previously, that the exo-dicyclopentadiene product be removed continuously from the reaction zone to avoid undesirable side reactions, e.g., polymerization, rearrangement, dedimerization, etc. To best achieve optimum efficiencies and yields, at least the exo-dicyclopentadiene product is maintained in an essentially gaseous state. A continuous operation which is performed in an elongated reaction zone, e.g., tubular reaction zone, is especially preferred. A single elongated reaction zone, or a plurality of elongated reaction arranged in parallel or series, can be employed. Heat exchange jackets, pressure sensitive devices, temperature recording devices, and other equipment familiar to the art can be utilized to advantage. Moreover, a temperature gradient can be effected along the elongated reaction zone by encompassing said zone with individual heat exchange jackets.

In general, the resolution of the effluent from the reaction zone can be effected by various means. The effluent can be condensed in a suitable vessel whereby a liquid organic phase and an aqueous phase occur. The aqueous phase can be discarded or further purified, as desired. The organic phase comprising unreacted reagent, exo-dicyclopentadiene product, cyclopentadiene by-product, inert diluent, if any, etc., can be subjected to distillation, fractionation, extraction, crystallization, and the like, to recover the individual components therein. If desired, the organic phase can be maintained at room temperature for several days, or mildly heated for several hours, to allow any monomeric cyclopentadiene to dimerize, thereby producing an isomeric mixture of endo- and exo-dicyclopentadienes. This isomeric mixture then can be reacted with a suitable epoxidizing agent to produce a mixture containing the corresponding diepoxide of the exo- and endo-dicyclopentadienes. Highly desirable epoxidizing agents which can be employed are the organic peracids, e.g., peracetic acid, perpropionic acid, perbenzoic acid, mono-perphthalic acid, perdodecanoic acid, etc., preferably dissolved in an inert, normally-liquid organic vehicle, e.g., ethyl acetate, acetone, etc. A suitable epoxidation reaction temperature range is from about 0° to about 100° C., preferably from about 20° to about 80° C.

The practice of the novel process results in several notable advantages, some of which are highly unexpected and unobvious, indeed. The efficiencies and yields are extraordinary in view of the well-known, rapid rate of dedimerization of dicyclopentadiene which is quite evident at temperatures as low as 180° C., and yet, the preferred operative temperature range of the novel process is from about 180° C. to about 350° C. Efficiencies and yields as high as 90 percent, and higher, can be achieved by the practice of the instant invention. On the other hand, attempts to prepare exo-dicyclopentadiene via thermal pyrolysis of the acetate ester of exo-dicyclopentadiene hydrate were unsuccessful. The reaction products which resulted from the above-said pyrolysis reaction comprised acetic acid and monomeric cyclopentadiene. Moreover, special corrosion-resistant equipment is not required in performing the novel process as would be the case if one followed various teachings of the prior art. For example, hydrogen iodide can be added to endo-dicyclopentadiene to give exo-dicyclopentadienyl iodide, followed by treatment with alcoholic potassium hydroxide to yield exo-dicyclopentadiene. The drawbacks of the preceding route which illustrate the preparation of the exo-diene are obvious. Corrosion resistant equipment is essential, and the reactions involved consume a stoichiometric quantity of hydrogen iodide in the addition step and a stoichiometric quantity of potassium hydroxide in the dehydrohalogenation step.

The following examples are illustrative.

EXAMPLES 1–8

In Examples 1–8 infra, the procedure employed was as follows. Exo-dicyclopentadiene hydrate (boiling point of 101°–104° C./4 mm. of Hg), prepared by the reaction of endo-dicyclopentadiene with an aqueous solution of sulfuric acid, was introduced into a 38 inch x 1 inch I.D. stainless steel tube which was packed with glass helices, alumina [1] pellets (150 cc.), and glass helices, in that order. When an inert, normally-liquid diluent was employed, the exo-dicyclopentadiene hydrate reagent was either dissolved in said diluent, i.e., benzene, and the resulting solution was introduced into the tubular reactor as a single stream, or said reagent and said diluent, i.e., water, were individually introduced in the tubular reactor as separate streams. The tubular reactor was heated ---
[1] Obtained from the Aluminum Corporation of America. Trade name is F–10 Alumina.

by a pressurized jacket containing decahydronaphthalene which extended the entire length of said reactor. The temperature was measured both by a thermocouple well inserted concentrically through the catalyst bed, and by reading the pressure on the external jacket and comparing it to a standard pressure-temperature curve for decahydronaphthalene. The effluent end of the tubular reactor was fitted with a cold water-jacketed trap and a Dry Ice-acetone cooled trap in succession.

The reaction product mixture (effluent) was allowed to separate into an upper organic phase and a lower aqueous phase. Cyclopentadiene by-product was removed from the organic layer by means of evaporative distillation at room temperature, or by rapid distillation with benzene at atmospheric pressure. The residual organic material then was subjected to distillation through an unpacked column at reduced pressure. The exo-dicyclopentadiene fraction was obtained as a mobile yellow liquid which had the following boiling point ranges: 62°–72° C./17 mm. of Hg, 61°–70° C./18 mm. of Hg, and 75°–83° C./31 mm. of Hg. Unreacted exo-dicyclopentadiene hydrate reagent was recovered as a liquid which had a boiling point range of about 100°–110° C./4 mm. of Hg. Unidentified by-products had boiling point ranges that fell between the exo-dicyclopentadiene fraction and the exo-dicyclopentadiene hydrate reagent. Fractionation of the exo-dicyclopentadiene fraction through a packed column resulted in a colorless or almost colorless liquid, i.e., exo-dicyclopentadiene, which had the following properties:

Boiling point _____ 80° C./30 mm. of Hg.
$n_D^{30}$ _____ 1.5029.

| Elemental Analysis ($C_{10}H_{12}$) | Found (percent) | Calculated (percent) |
|---|---|---|
| Carbon | 91.00 | 90.85 |
| Hydrogen | 9.21 | 9.15 |

The product was further identified and authenticated by its infrared spectrum.

The pertinent data are set forth in Table I below.

*Table I*

| Example Number | Inert Diluent [1] | Reagent, Grams/Hour | Diluent, Grams/Hour | Temperature, ° C. | Conversion, Percent | Yield, Percent | Productivity [2] |
|---|---|---|---|---|---|---|---|
| 1 | None | 132–196 | | 295 | 81 | 24 | 110 |
| 2 | Water | 51 | 83 | 258 | 55 | 16.5 | 50 |
| 3 | ---do--- | 61 | 97 | 280 | 51 | 27 | 96 |
| 4 | ---do--- | 112 | 92 | 309 | 81 | 40.5 | 265 |
| 5 | ---do--- | 124 | 115 | 315 | 75 | 45 | 324 |
| 6 | Benzene | 61 | 73 | 260 | >95 | 57 | 202 |
| 7 | ---do--- | 104 | 172 | 282 | >95 | 63 | 382 |
| 8 | ---do--- | 175 | 59 | 285 | 89 | 62 | 638 |

[1] Exo-dicyclopentadiene hydrate and water, respectively, were introduced into the tubular reactor as separate streams. Exo-dicyclopentadine hydrate and benzene were introduced as a solution into the tubular reactor.
[2] The alumina catalyst employed in Example 1 was in the form of pellets which exceeded 0.25 inch in average diameter. In Examples 2-8, the average diameter of said pellets ranged from 0.125 to 0.25 inch. In Example 1, the productivity is based on grams of exo-dicyclopentadiene/hour/kilogram of catalyst; in Examples 2-8, the productivity is based on grams of exo-dicylopentadiene/hour/liter of catalyst. Productivity does not signify catalyst inactivation. The catalyst was highly active at the termination of the respective runs.

EXAMPLE 9

To an 11 inch x 0.625 inch I.D. oil-jacketed glass tube which contained 26 grams of titania, there was introduced continuously, over a period of 5 hours, a solution of 37 grams of benzene and 37 grams of exo-dicyclopentadiene hydrate. The operative temperature was maintained between about 210° C. and 248° C. The effluent condensed in a vessel contained in a cooling medium, and the resulting condensate was allowed to separate into an upper organic phase and a lower aqueous phase. The organic phase contained a substantial quantity of exo-dicyclopentadiene as the desired product and, in addition, some by-products such as cyclopentadiene. The identity phase chromatographic analysis.

EXAMPLE 10

To an 11 inch x 0.625 inch I.D. oil jacket glass tube which contained 18 grams of asbestos impregnated with ortho-phosphoric acid, there was introduced continuously, over a period of 1.8 hours, a solution of 11.5 grams of benzene and 11.5 grams of exo-dicyclopentadiene hydrate. The operative temperature was maintained between about 267° C. and 322° C. The effluent condensed in a vessel contained in a cooling medium, and the resulting condensate was allowed to separate into an upper organic phase and a lower aqueous phase. The presence of exo-dicyclopentadiene in the organic phase was confirmed by vapor phase chromatographic analysis.

Reasonable variations and modifications of the invention can be made or carried out in the light of the disclosure without departing from the spirit and scope thereof.

What is claimed is:

1. A process which comprises dehydrating exo-dicyclopentadiene hydrate, in a reaction zone, in the presence of a dehydration catalyst, at a temperature in the range of from about 100° C. to about 500° C., under a pressure sufficient to maintain the resulting exo-dicyclopentadiene product predominantly in the gaseous state, collecting a liquid effluent from said reaction zone, and recovering organic material comprising exo-dicyclopentadiene from said effluent.

2. The process of claim 1 wherein the dehydration reaction is conducted at a temperature in the range of from about 180° C. to about 350° C.

3. A process which comprises continuously commingling, in a reaction zone, exo-dicyclopentadiene hydrate with a dehydration catalyst, at a temperature in the range of from about 180° C. to about 350° C., for a residence period of from about 0.05 second to about 1 minute, under a pressure sufficient to maintain the resulting exo-dicyclopentadiene product predominantly in the gaseous state, and recovering said exo-dicyclopentadiene as a liquid product.

4. The process of claim 3 wherein the operative temperature is in the range of from about 210° C. to about 330° C., and wherein the operative pressure is in the range of from about 10 mm. of Hg to atmospheric pressure.

5. A process which comprises continuously introducing exo-dicyclopentadiene hydrate into an elongated reaction zone which contains therein a dehydration catalyst, at a temperature in the range of from about 180° C. to about 350° C., under a pressure sufficient to maintain the resulting exo-dicyclopentadiene product predominantly in the gaseous state, and recovering exo-dicyclopentadiene as a liquid product from said zone.

6. The process of claim 5 wherein the reaction is conducted at a temperature in the range of from about 210° C. to about 330° C., wherein the residence period is from about 0.1 second to about 20 seconds, and wherein the pressure does not exceed atmospheric pressure.

7. The process of claim 6 wherein said process is effected in the presence of an alumina dehydration catalyst.

8. The process of claim 6 wherein said process is effected in the presence of a thoria dehydration catalyst.

9. The process of claim 6 wherein said process is effected in the presence of a silica-alumina dehydration catalyst.

10. The process of claim 6 wherein said process is effected in the presence of a titania dehydration catalyst.

11. The process of claim 6 wherein said dehydration catalyst is ortho-phosphoric acid deposited on a solid carrier.

References Cited in the file of this patent

FOREIGN PATENTS 956,507   Germany _____ Jan. 17, 1956

OTHER REFERENCES

Reimschneider: Zeitschrift fur Naturforschung, Vol. 16b, page 140 (February 1961).

Reimschneider: Chemical Abstracts, Vol. 55, 14328h (1961).